United States Patent
Miyakawa et al.

(10) Patent No.: US 6,519,078 B2
(45) Date of Patent: Feb. 11, 2003

(54) RAMAN AMPLIFIER

(75) Inventors: Takayuki Miyakawa, Kamifukuoka (JP); Noboru Edagawa, Kamifukuoka (JP); Masatoshi Suzuki, Kamifukuoka (JP)

(73) Assignee: KDD Submarine Cable Systems, Inc., Tokyo (JP)

( * ) Notice: Subject to any disclaimer, the term of this patent is extended or adjusted under 35 U.S.C. 154(b) by 0 days.

(21) Appl. No.: 09/887,915

(22) Filed: Jun. 21, 2001

(65) Prior Publication Data

US 2002/0001123 A1 Jan. 3, 2002

(30) Foreign Application Priority Data

Jun. 28, 2000 (JP) ......................................... 2000-194646

(51) Int. Cl.[7] ................................................. H01S 3/30
(52) U.S. Cl. ..................... 359/334; 359/337; 359/337.5; 359/343
(58) Field of Search ................................ 359/334, 337, 359/337.5, 343

(56) References Cited

U.S. PATENT DOCUMENTS

| | | | | |
|---|---|---|---|---|
| 5,039,199 A | * | 8/1991 | Mollenauer et al. | 359/334 |
| 5,058,974 A | * | 10/1991 | Mollenauer | 359/334 |
| 5,623,508 A | | 4/1997 | Grubb et al. | 372/3 |
| 5,778,128 A | * | 7/1998 | Wildeman | 359/124 |
| 5,959,750 A | * | 9/1999 | Eskildsen et al. | 359/134 |
| 6,081,366 A | * | 6/2000 | Kidorf et al. | 359/334 |

(List continued on next page.)

FOREIGN PATENT DOCUMENTS

| | | |
|---|---|---|
| EP | 0 421 675 A2 | 4/1991 |
| WO | WO99/49580 | 9/1999 |

OTHER PUBLICATIONS

Imai et al. OFC '99 Feb. 21–26, 1999.*
Emori et al. Elec. Letts. Oct. 29, 1998 vol. 34 No. 22.*
Kikuchi et al. Elec. Letts. Mar. 14, 1996 vol. 32 No. 6.*
Bergano et al. OFC '99 Feb. 21–26, 1999.*
Emori et al. OFC '99 Feb. 21–26 1999.*
Suzuki et al. Elec. Letts. Jul. 8, 1999 vol. 35 No. 14.*
Hansen et al. OFC '97 Feb. 16–21 1997.*
T. Miyakawa, et al., "210Gbit/s (10.7Gbit/s ×21 WDM) Transmission over 1200km with 200km Repeater Spacing for the Festoon Undersea Cable System," OFC 2000, Baltimore, Maryland, Mar. 7–10, 2000. (3 pages).
H. Kawakami, et al., "Highly efficient distributed Raman amplification system in a zero–dispersion–flattened transmission line," OAA 1999 Nara, Japan, Jun. 9–11, 1999 pp. 110–113.

(List continued on next page.)

Primary Examiner—Thomas G. Black
Assistant Examiner—Stephen Cunningham
(74) Attorney, Agent, or Firm—Christie, Parker & Hale, LLP (57) ABSTRACT

The object of this invention is to improve SNR in the Raman amplification. An optical fiber (10) consists of a dispersion shift fiber in which a zero dispersion wavelength is shifted to the 1.55 $\mu$m band, and an optical fiber (12) consists of a single mode optical fiber having the effective core area of 100 $\mu m^2$ which is larger than that of the optical fiber (10). An optical coupler 14 is disposed at the optical signal emission end of the optical fiber (12). A laser diode (16) outputs the laser light of 1455 nm as a Raman pumping light source. The output light from the laser diode (16) is introduced into the optical fiber (12) from the back, namely in the opposite direction to that of the optical signal propagation. The ratio of the Raman gain coefficient of the optical fiber (12) to that of the optical fiber (11) should be 1/1.08 or less, preferably 1/1.1 or less.

10 Claims, 7 Drawing Sheets

U.S. PATENT DOCUMENTS 6,147,794 A * 11/2000 Stentz ..................... 359/124
6,163,636 A * 12/2000 Stentz et al. ............... 359/124
6,191,877 B1 * 2/2001 Chraplyvy et al. ......... 359/124

OTHER PUBLICATIONS

Patent Abstracts of Japan, Publication No. 2000349716; Publication Date: Dec. 15, 2000, Nippon Telegr & Teleph Corp.

Y. Akasaka et al, "Characteristics of Optical Fibers for Discrete Raman Amplifiers"; ECOC 1999, Sep. 26–30, 1999, Nice, France, pp. 288–289.

European Search Report, EP 0111 5122, dated Jul. 18, 2002.

* cited by examiner

RAMAN AMPLIFIER

CROSS-REFERENCE TO RELATED APPLICATION

This application claims priority of Japanese patent Application No. 2000-194646, filed on Jun. 28, 2000.

FIELD OF THE INVENTION

This invention relates to a Raman amplifier.

BACKGROUND OF THE INVENTION

To extend a transmission distance of a repeaterless optical transmission line and a repeater span of an optical amplifier repeater transmission line, a fiber Raman amplifier to amplify the optical signal on an optical transmission line is effective, and thereby receiving sensitivity and the SNR (the signal-to-noise ratio) are improved. For example, see T. Miyakawa et al., "210 Gbit/s (10.7 Gbit/s×21 WDM) Transmission over 1200 km with 200 km Repeater Spacing for the Festoon Undersea Cable System", OFC 2000, Baltimore, Md., USA, Mar. 7–10, 2000 and H. Kawakami et al., "Highly efficient Distributed Raman amplification system in a zero-dispersion-flattened transmission line", OAA1999 Nara, Japan, Jun. 9–11, 1999.

In fiber Raman amplifiers, there are two kinds of methods of pumping. One is a forward pumping method in which the high-output pumping light to produce Raman amplification on an optical transmission line enters onto the optical transmission line in the same direction with that of signal propagation, namely from the front, and the other is a backward pumping method in which the pumping light enters onto the optical transmission line in the opposite direction to that of the optical signal propagation, namely from the back. The Raman amplification is caused by nonlinear effects of an optical fiber. Accordingly, to increase the Raman gain, it is necessary to increase pumping power and/or employ an optical fiber with large nonlinear effects. On condition that optical fibers are of the same material and configuration, the one having the smallest core diameter has the largest nonlinear effect.

In conventional fiber Raman amplifiers, an optical fiber of a large core diameter is used for the first half part of an optical transmission line where power of the optical signal is large, and an optical fiber of a small core diameter, i.e. an optical fiber of large Raman gain coefficient, is used for the latter half part of the optical fiber where the power of the optical signal is small. Then, the pumping light is introduced into the latter optical fiber from the back in the opposite direction from that of optical signal propagation. With this operation, the weak optical signal is amplified at the latter half part of the optical transmission line, and accordingly the decrease of the optical signal level is moderated or the optical signal level is increased.

When it is possible to moderate the decrease of the optical signal level or to increase the optical signal level, to extend a repeaterless optical transmission distance or a repeater span is also possible.

However, in the Raman amplification, the accumulated optical noise power also increases in the same time. Therefore, in the conventional methods, although there is no problem in terms of the optical signal level, receiving characteristics become degraded due to the rapid deterioration of the SNR.

SUMMARY OF THE INVENTION

It is therefore an object of the present invention to provide a Raman amplifier to solve the above problems.

Another object of the present invention is to provide a Raman amplifier to offer the satisfactory SNR while keeping the necessary Raman gain.

A Raman amplifier according to this invention consists of a first optical fiber to propagate the optical signal, a second optical fiber to which the optical signal output from the first optical fiber enters, the pumping light source to generate the pumping light for Raman amplification, and an optical introducer to introduce the output light from the pumping light source into the second optical fiber from the output side of the optical signal, the Raman amplifier characterized in that the ratio of the Raman gain coefficient of the second optical fiber to that of the first optical fiber is 1/1.08 or less.

By using the above configuration, it is possible to shift the location at which the optical signal is amplified into the input side, and consequently the SNR can be improved because the accumulated optical noise amount is reduced at the input part of a receiver.

When a fiber length of a certain unit is assumed, Raman gain (dB) increases proportional to the intensity (mW or W) of the pumping light, and the Raman gain and the optical noise power caused by the Raman gain are proportional. The optical noise amount generated by the same Raman gain is unchanged. However, the optical noise at the receiver differs according to locations of the occurrence. The optical noises generated at the points near to the receiver are detected as the optical noises of almost the same level. However, when the point of the Raman gain occurrence shifts to the transmitter side, the optical noise detected at the receiver is reduced according to the shifted length toward the transmitter side. Therefore, the more the location of the Raman gain occurrence shifts to the transmitter side, the more the SNR at the receiver is improved.

BRIEF DESCRIPTION OF THE DRAWING

The above and other objects, features and advantages of the present invention will be apparent from the following detailed description of the preferred embodiments of the invention in conjunction with the accompanying drawings, in which.

DESCRIPTION OF THE PREFERRED EMBODIMENT

Embodiments of the invention are explained below in detail with reference to the drawings.

Figure 1:
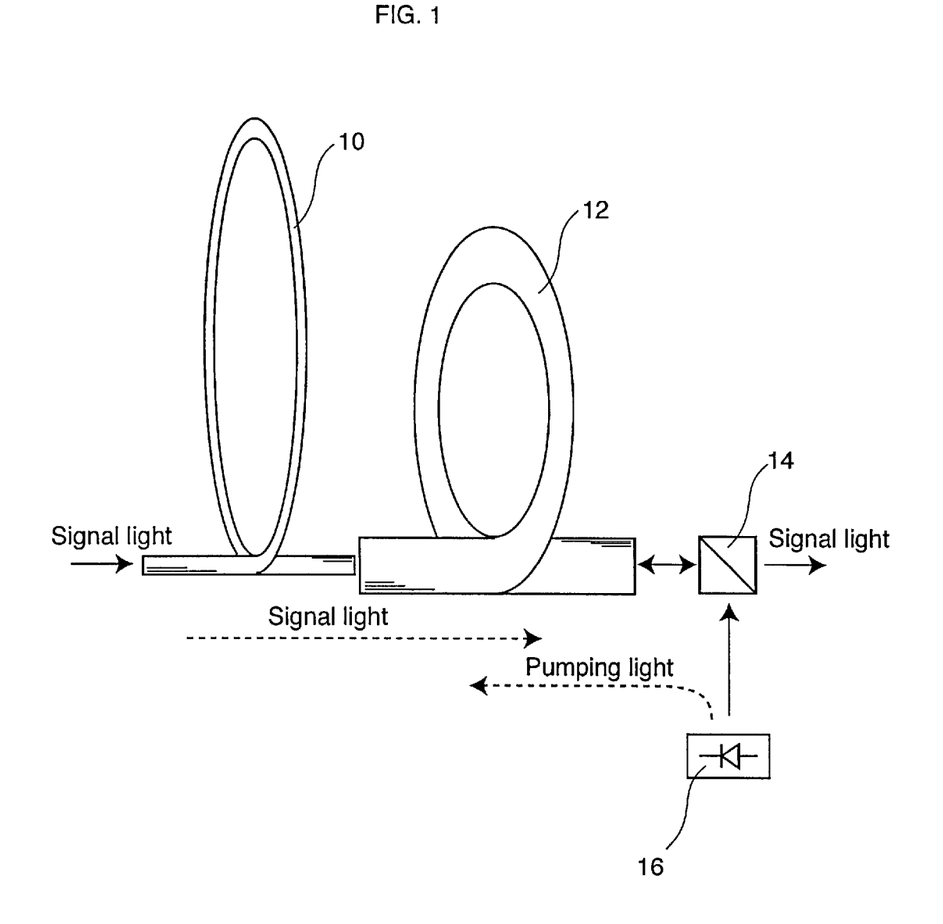
FIG. 1 shows a schematic diagram of an embodiment according to the invention.

FIG. 1 shows a schematic block diagram of an example according to the invention. Reference numeral 10 denotes a dispersion shifted fiber in which the zero dispersion wavelength is shifted to the 1.55 µm band, and 12 denotes a single mode optical fiber having the effective core area of approximately 100 µm² which is larger than that of the optical fiber 10. In FIG. 1, the core parts of the optical fibers 10 and 12 are schematically illustrated.

The optical signal enters the dispersion shifted fiber 10 first, propagates on the fiber, and then enters the single mode optical fiber 12. An optical coupler 14 is disposed on the emission end for the optical signal of the single mode optical fiber 12. A laser diode 16 outputs the 1,455 nm laser light as the pumping light source. The output light from the laser diode 16 is introduced into the optical fiber 12 from the back, namely in the opposite direction from that of the optical signal propagation, by the optical coupler 14. The optical signal amplified in the optical fibers 10 and 12 as explained later enters the following optical component (for example, an optical fiber or a photodetector), which is not illustrated, through the optical coupler 14.

The pumping light introduced into the optical fiber 12 by the optical coupler 14 amplifies the optical signal as it gradually attenuates while propagating on the optical fiber 12. However, in this embodiment, an optical fiber having a small Raman gain coefficient is used as the optical fiber 12 so that the location at which the Raman amplification occurs is to shift toward the optical fiber 10, namely toward the input side of the optical signal.

In the conventional systems, an optical fiber having the large Raman gain coefficient is disposed on the part where the optical signal becomes weak so that the Raman effect strongly affects the optical signal. Besides the Raman gain coefficient becomes larger as the core diameter of the optical fiber becomes smaller, it also depends on a dopant. Generally, the Raman gain is increased by enhancing the nonlinear effect through the reduction of the core diameter.

On the other hand, in this embodiment, the core diameter of the optical fiber 12 located at the back is larger than that of the optical fiber 10 located at the part where the optical signal is intensive. As a result, the Raman gain coefficient in the optical fiber 12 becomes smaller, and the Raman amplification occurs at the parts near to the optical fiber 10 in the optical fiber 12 and in the optical fiber 10. In other words, in this embodiment, the location of the Raman amplification occurrence shifts to the input side compared to the conventional systems. Idealistically, an optical fiber which Raman gain coefficient is zero should be used as the optical fiber 12. In that case, the Raman amplification occurs only in the optical fiber 10.

As the location of the Raman amplification occurrence shifts to the input side, it is possible to suppress the accumulated optical noise power which is relatively caused by the Raman amplification, and consequently the SNR improves.

Figure 2:
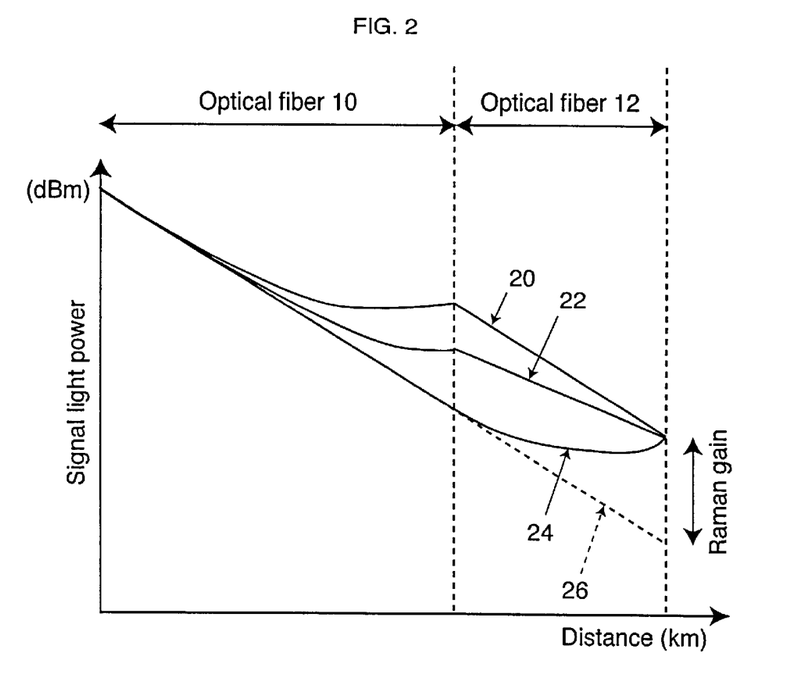
FIG. 2 is a schematic diagram of distance variation of optical signal power in the optical fibers 10 and 12.

FIG. 2 is a schematic diagram showing distance variation of optical signal power in the optical fibers 10 and 12. On condition that the Raman amplification is unchanged, a case to use an optical fiber having the Raman gain coefficient of small value other than zero as the optical fiber 12, a case to use an optical fiber having the zero Raman gain coefficient as the optical fiber 12, and a conventional method to amplify the optical signal on an optical fiber composed of a single component are compared.

In FIG. 2, the vertical axis expresses optical signal power (dBm), and the horizontal axis expresses distance (km). A characteristic curve 20 shows distance variation of optical signal power when an optical fiber having the zero Raman gain coefficient is used as the optical fiber 12. A characteristic curve 22 shows distance variation of the optical signal power when an optical fiber having the Raman gain coefficient of small value other than zero is used as the optical fiber 12. A characteristic curve 24 shows distance variation of the optical signal power in a conventional system as a comparative example in which an optical fiber of a single component is used instead of the optical fibers 10 and 12. A broken line 26 shows distance variation of the optical signal power when the Raman amplification is not used.

As clear from the characteristic curves 20, 22, and 24, the optical signal is amplified faster as the Raman gain coefficient of the optical fiber 12 becomes smaller.

Figure 3:
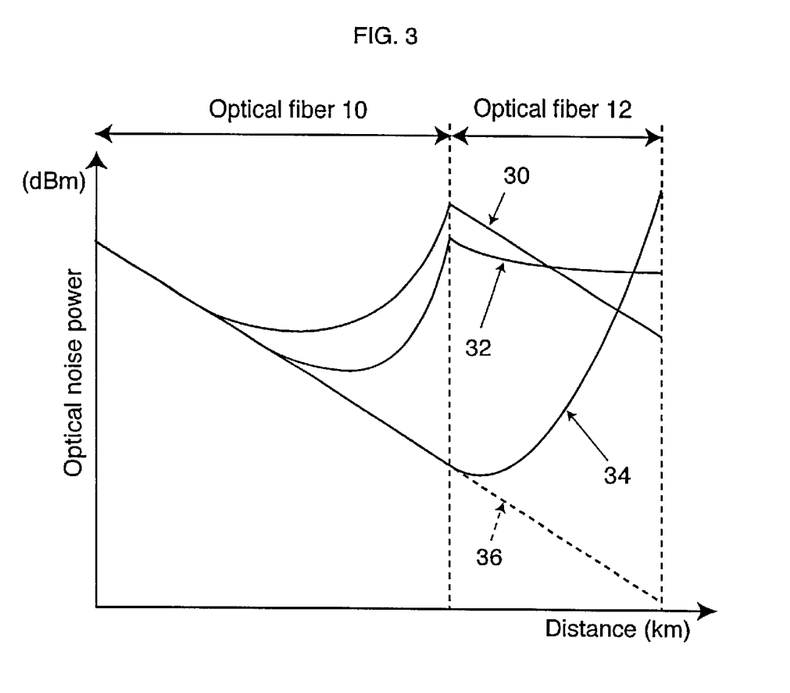
FIG. 3 shows a schematic diagram of distance variation of optical noise power in the optical fibers 10 and 12 corresponding to FIG. 2.

FIG. 3 is a schematic diagram showing distance variation of the optical noise power in the optical fibers 10 and 12 corresponding to FIG. 2. In FIG. 3, the vertical axis expresses optical noise power (dBm), and the horizontal axis expresses distance (km). A characteristic curve 30 shows distance variation of optical noise power when an optical fiber having the zero Raman gain coefficient is used as the optical fiber 12. A characteristic curve 32 shows distance variation of the optical noise power when an optical fiber having Raman gain coefficient of small value other than zero is used as the optical fiber 12. A characteristic curve 34 shows that in case of a conventional system. A broken line 36 shows distance variation the of optical noise power when the Raman amplification is not used. When the Raman amplification is not used, the optical noise also attenuates according to the loss of the optical fiber.

When the optical fiber having the zero Raman gain coefficient is used as the optical fiber 12, the Raman amplification occurs in the optical fiber 10 as shown with the characteristic curve 20. Accordingly, the optical noise caused by the Raman amplification also occurs at the part where the Raman amplification occurs and is amplified as shown with the characteristic curve 30. In the optical fiber 12, since the Raman amplification does not occur, the optical noise attenuates according to the loss of the optical fiber 12.

When the optical fiber having the Raman gain coefficient of small value other than zero is used as the optical fiber 12, the Raman amplification occurs in the latter half part of the optical fiber 10 and in the optical fiber 12 as shown with the characteristic curve 22. Accordingly, the optical noise caused by the Raman amplification also occurs in the latter half part of the optical fiber 10 and in the optical fiber 12 and is amplified as shown with the characteristic curve 32. Since the interval of the Raman amplification occurrence becomes relatively longer compared to the case using the optical fiber of the zero Raman gain coefficient, the optical noise becomes more intense. The accumulated optical noise power at the output end of the optical fiber 12 becomes larger compared to the case using the optical fiber of zero Raman gain coefficient.

In the conventional system, since the large Raman gain occurs at the part near to the signal emission end of the optical fiber 12, the accumulated optical noise rapidly increases as approaching to the signal emission end of the optical fiber 12 as shown with the characteristic curve 34. The accumulated optical noise power at the output end of the optical fiber 12 becomes the largest in the above cases.

Figure 4:
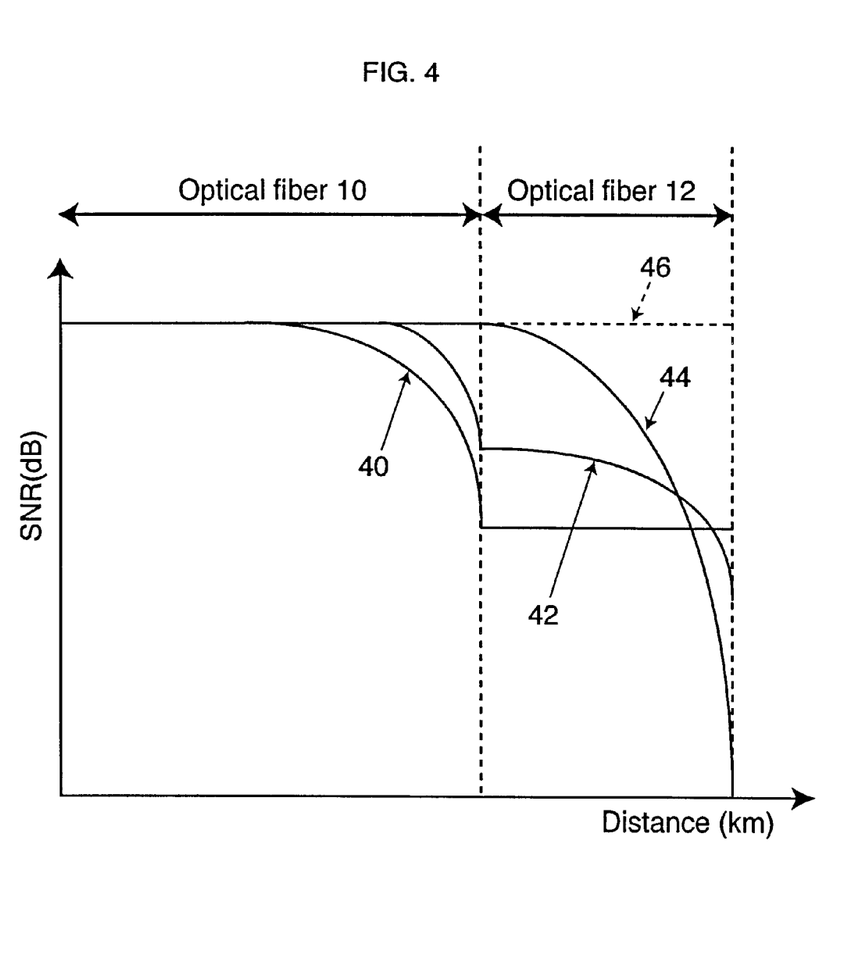
FIG. 4 shows a schematic diagram of distance variation of the SNR.

FIG. 4 is a schematic diagram showing distance variation of SNR calculated from the results shown in FIGS. 2 and 3. In FIG. 4, the vertical axis expresses SNR (dB) and the horizontal axis expresses distance (km). A characteristic curve 40 shows a case in which an optical fiber having a zero Raman gain coefficient is used as the optical fiber 12. A characteristic curve 42 shows a case in which an optical fiber having a Raman gain coefficient of small value other than zero is used as the optical fiber 12. A characteristic curve 44 shows a case of conventional system. A broken line 46 shows distance variation of the SNR when the Raman amplification is not used. When the Raman amplification is not used, the SNR is constant because both optical signal and optical noise attenuate according to the loss of the optical fiber.

When the optical fiber having the zero Raman gain coefficient is used as the optical fiber 12, the Raman amplification occurs and optical noise is also generated in the optical fiber 10 as shown with the characteristic curves 20 and 30. Accordingly, as shown with the characteristic curve 40, the SNR deteriorates at that part. However, since the Raman amplification does not occur in the optical fiber 12, the SNR is constant in the optical fiber 12.

When the optical fiber having the Raman gain coefficient of small value other than zero is used as the optical fiber 12, the Raman amplification occurs and also optical noise is generated in the latter half part of the optical fiber 10 as shown with the characteristic curves 22 and 32. Accordingly, the SNR first deteriorates in the latter half part of the optical fiber 10 and further deteriorates in the optical fiber 12 as shown with the characteristic curve 42. Consequently, the SNR at the output end of the optical fiber 12 generally becomes smaller as compared with the case using the optical fiber of the zero Raman gain coefficient.

In the conventional system, the large Raman gain occurs and also optical noise is generated at the part near to the optical signal emission end of the optical fiber 12 as shown with the characteristic curves 24 and 34. Accordingly, the SNR rapidly deteriorates as approaching to the optical signal emission end of the optical fiber 12 as shown with the characteristic curve 44. The SNR at the output end of the optical fiber 12 becomes the smallest in the above cases.

The improving effect of the SNR depends on how far the Raman amplification can be shifted toward the optical signal input side. When a fiber length of a certain unit is assumed, the Raman gain (dB) increases proportional to the intensity (mW or W) of the pumping light, and the Raman gain and the optical noise power caused by the Raman gain are proportional. The optical noise amount generated by the same Raman gain is unchanged. Optical noises generated near to the receiver are detected as the optical noises of almost the same level. However, when the part of the Raman gain occurrence shifts to the transmitter side, the optical noise detected at the receiver is reduced according to the shifted length toward the transmitter side. Therefore, the more the location of the Raman gain occurrence shifts to the transmitter side, the more the SNR at the receiver is improved.

Figure 5:
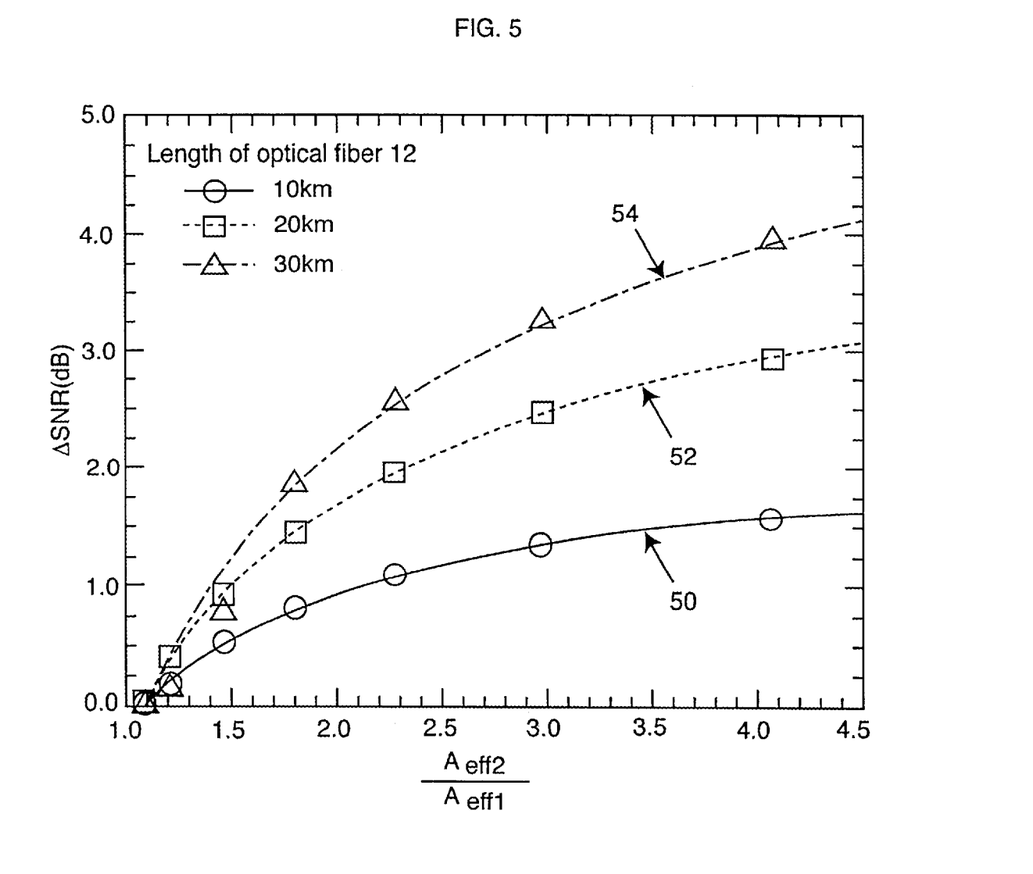
FIG. 5 shows variation examples of the SNR relative to the ratio of the effective core areas of the optical fibers 10, 12 and the length of the optical fiber 12.
Figure 6:
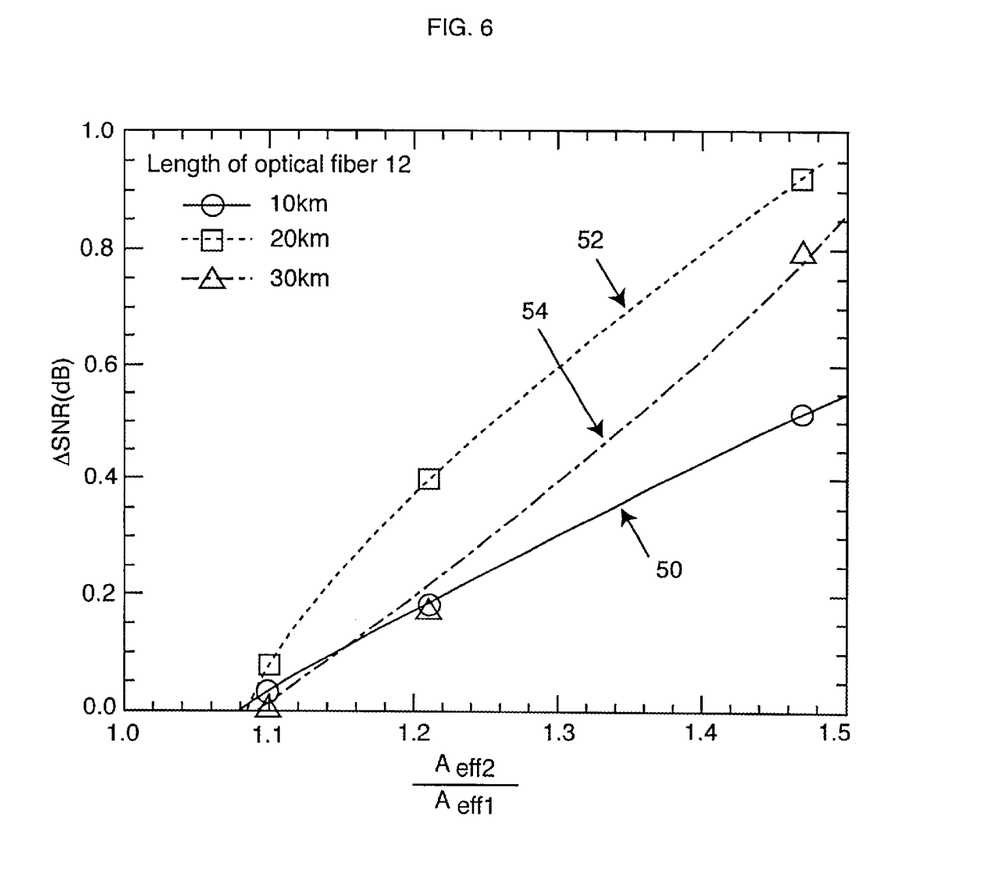
FIG. 6 shows an enlarged diagram of a part of FIG. 5.

The Raman gain coefficient is inversely proportional to the effective core area, and so it was checked how the SNR is improved in relation to the ratio of the effective core areas of the optical fibers 10 and 12 and the length of the optical fiber 12. FIGS. 5 and 6 show the measured result. In FIGS. 5 and 6, the horizontal axes express the ratio $A_{eff2}/A_{eff1}$ between the effective core area $A_{eff2}$ of the optical fiber 12 to the effective core area $A_{eff1}$ of the optical fiber 10, and the horizontal axes express the relative value ΔSNR (dB) of the SNR. FIG. 6 is an enlarged diagram showing the part where the effective core area ratio is 1.5 or less. Here, the pumping power is 500 mW.

The Raman gain coefficient depends on a dopant and its density besides the effective core area. The dopant includes $GeO_2$, $P_2O_5$, and $B_2O_3$ etc.

The SNRs of the optical fibers 12 of 10 km, 20 km and 30 km in length were checked, and the examination proved that the SNR was improved at each length when the effective core area of the optical fiber 12 is larger than that of the optical fiber 10 by 8%, preferably 10%. A characteristic curve 50 shows a case that the optical fiber 12 is 10 km, a characteristic curve 52 shows a case that the optical fiber is 20 km, and a characteristic curve 54 shows a case that the optical fiber is 30 km. Accordingly, in terms of the Raman gain coefficient, the SNR is improved when the ratio of the Raman gain coefficient of the optical fiber 12 to that of the optical fiber 10 is 1/1.08 or less, preferably 1/1.1 or less.

This embodiment is applicable to an optical repeater transmission line composed of three types of fibers in a repeater span. In a single repeater span, a single mode fiber (SMF) of a 110 $\mu m^2$ effective core area, +19 ps/nm/km chromatic dispersion, and 15 km in length, a reverse dispersion fiber (RDF) of 35 $\mu m^2$ effective core area, −20 ps/nm/km chromatic dispersion, and 20 km in length, and a dispersion shift fiber (DSF) of 65 $\mu m^2$ effective core area, +8 ps/nm/km chromatic dispersion, and 10 km in length are connected in this order, and the pumping light for causing the Raman amplification is introduced from the back of the DSF. 134 spans of this 45 km span were prepared to form a 6030 km optical fiber, and 32 wavelengths of 10 Gb/s were transmitted on the fiber. Compared to a case that a span is composed of only the SNR and the RDF, Q value is improved by 0.8 dB. This is brought by the SNR improving effect of this embodiment.

Figure 7:
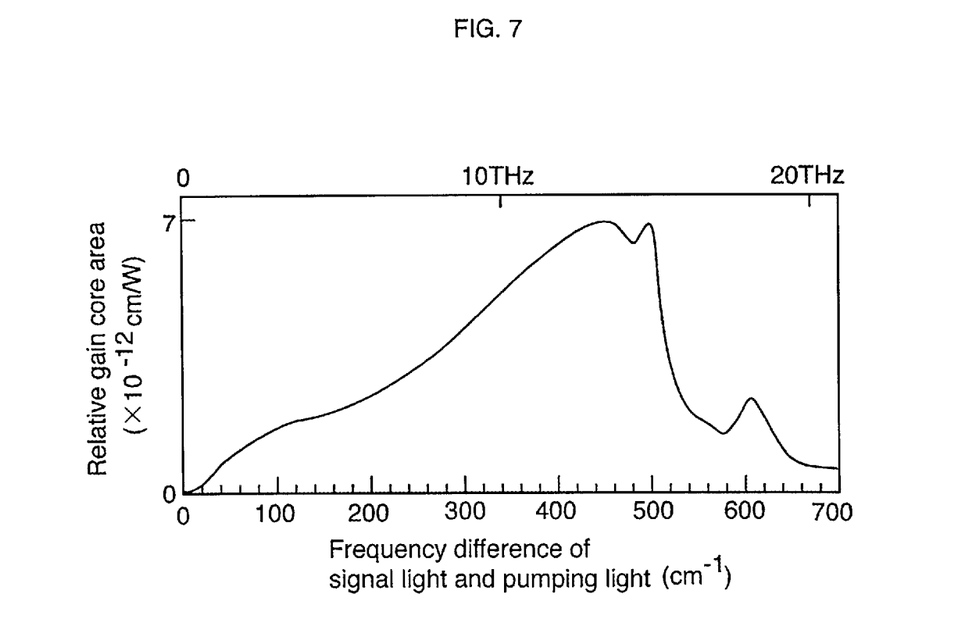
FIG. 7 shows a diagram of the Raman gain of $SiO_2$.

The Raman amplification has the highest pumping efficiency when the laser light having a wavelength shorter than that of the optical signal by an inherent wavelength of the medium to cause the Raman amplification is used as the pumping light source. This wavelength difference is called Raman shift wavelength. FIG. 7 shows a characteristic diagram of Raman gain relative to $SiO_2$. The horizontal axis expresses a frequency difference between the optical signal and the pumping light, and the vertical axis expresses a relative gain core area. Here, 1 $cm^{-1}$ is equal to 30 GHz.

In the embodiment shown in FIG. 1, although the laser light source of the single wavelength is used as the pumping light source for the Raman amplification, it is also applicable to introduce the light obtained by multiplexing the output lights from a plurality of laser sources of different wavelengths into the optical fiber 12 from the back. In that case, preferably the wavelength difference of each laser light source is equal to the Raman shift wavelength. Since the laser light of each wavelength is sequentially amplified in the optical fibers 10 and 12, ultimately the point where the optical signal is amplified can be shifted to the input side of the optical signal.

Figure 8:
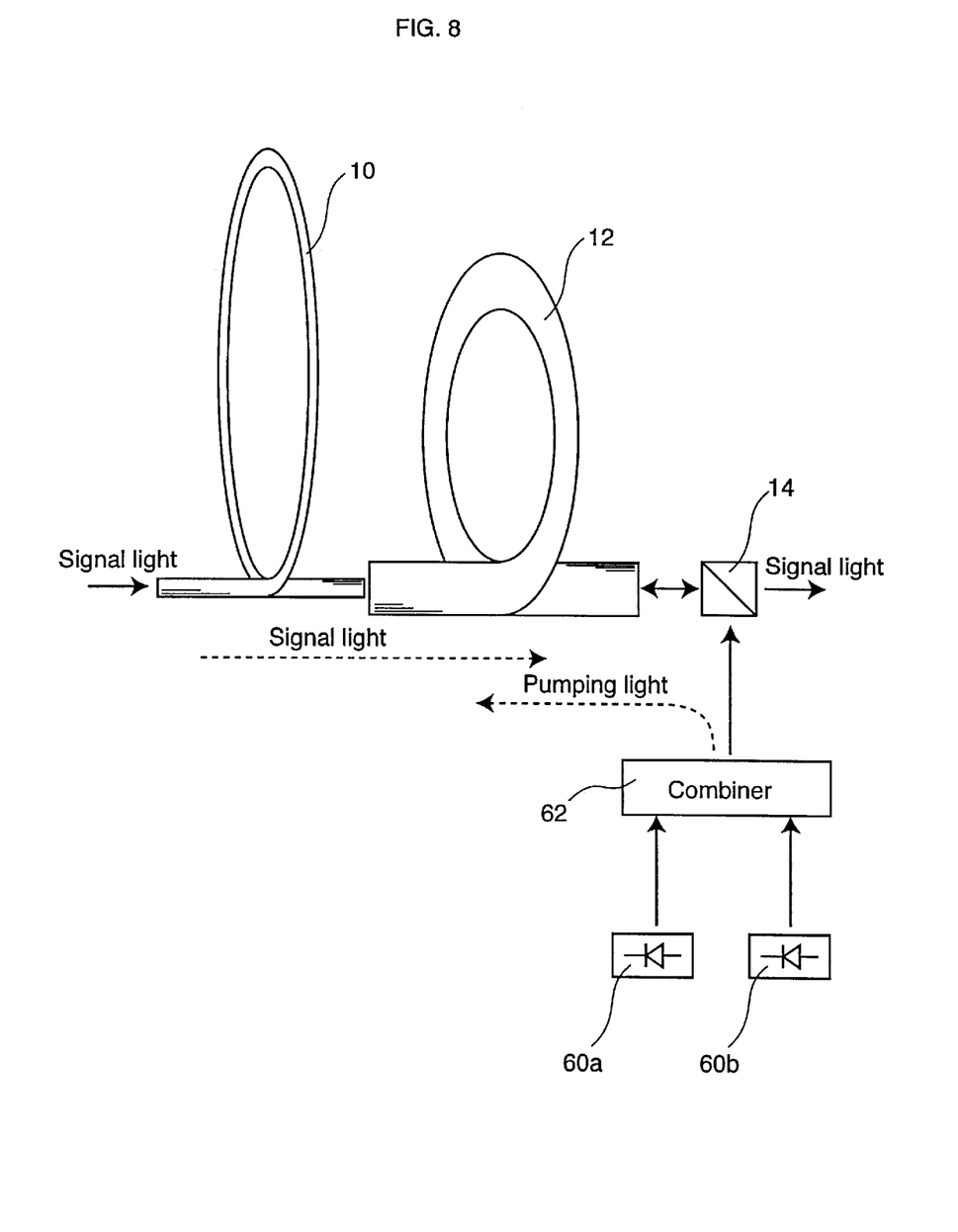
FIG. 8 is a schematic diagram of a modified embodiment according to the invention.

The Raman shift wavelength is equal to a frequency of 13 THz. For example, a 1450 nm pumping wavelength is to amplify 1550 nm, and a 1360 nm pumping wavelength is to amplify 1450 nm. As shown in FIG. 8, the 1360 nm laser light source 60a, the 1450 nm laser light source 60b, and a combiner 62 to combine output lights from the both laser light sources are disposed instead of the laser diode 16. Elements identical to those in FIG. 1 are labeled with common reference numerals. In this configuration, the 1360 nm laser light and the 1450 nm laser light together enter the optical fiber 12 from the back. The 1450 nm laser light is amplified by the 1360 nm laser light while propagating on the optical fibers 10 and 12 in the opposite direction to that of the optical signal. The 1450 nm amplified laser light amplifies the optical signal propagating on the optical fibers 10 and 12. The Raman amplification requires a certain propagation distance. Accordingly, the range in which the optical signal is amplified can be shifted toward the input side of the optical signal using this kind of the multi-step type Raman amplification, and also the SNR can be improved because of the reasons priorly explained.

In addition, the output lights from the laser light sources 60a and 60b can be introduced by discrete optical coupler separately into the optical fiber 12.

As readily understandable from the aforementioned explanation, according to the invention a fiber Raman amplifier having an improved SNR can be realized.

While the invention has been described with reference to the specific embodiment, it will be apparent to those skilled in the art that various changes and modifications can be made to the specific embodiment without departing from the spirit and scope of the invention as defined in the claims.

What is claimed is:

1. A Raman amplifier comprising:
   a first optical fiber having a first core diameter to propagate an optical signal;
   a second optical fiber having a second core diameter and an output side to accept as an input the optical signal output from the first optical fiber, wherein the second core diameter is larger than the first core diameter;
   a pumping light source to generate a pumping light for Raman amplification; and
   an optical introducer to introduce the output light from the pumping light source into the second optical fiber from the output side of the optical signal of the second optical fiber, wherein the ratio of a Raman gain coefficient of the second optical fiber to that of the first optical fiber is 1/1.08 or less.

2. The Raman amplifier of claim 1 wherein the ratio of the Raman gain coefficient of the second optical fiber to that of the first optical fiber is 1/1.1 or less.

3. The Raman amplifier of claim 1 wherein the first optical fiber comprises a dispersion shift fiber, and the second optical fiber comprises a single mode optical fiber having an effective core area of 100 $\mu m^2$ or more.

4. The Raman amplifier of claim 1 wherein the pumping light source comprises a plurality of light sources having the wavelength difference equal to the Raman shift wavelength.

5. The Raman amplifier of claim 1 further comprising a second pumping light source to generate a second pumping light which can amplify the output light from the pumping light source on the first and the second optical fibers.

6. A Raman amplifier comprising:
   a first optical fiber having a first core diameter and a first Raman gain coefficient, said first optical fiber disposed to accept an optical signal;
   a second optical fiber having a second core diameter and a second Raman gain coefficient such that a ratio of the Raman gain coefficient of the second optical fiber to that of the first optical fiber is 1/1.08 or less, the second optical fiber disposed to accept the optical signal from the first optical fiber, wherein the second core diameter is larger than the first core diameter;
   a pumping light source that generates a pumping light for Raman amplification; and
   an optical introducer that introduces the pumping light from the second optical source into the second optical fiber at a point of the pumping light fiber distal to the point where the second optical fiber accepts the optical signal from the first optical fiber.

7. The Raman amplifier of claim 1 wherein the ratio of the Raman gain coefficient of the second optical fiber to the Raman gain coefficient of the first optical fiber is 1/1.1 or less.

8. The Raman amplifier of claim 6 wherein the first optical fiber comprises a dispersion shift fiber, and the second optical fiber comprises a single mode optical fiber having an effective core area of 100 $\mu m^2$ or more.

9. The Raman amplifier of claim 6 wherein the first pumping light source comprises a plurality of light sources, the plurality of light sources having adjacent wavelengths differing by an amount equal to the Raman shift wavelength.

10. The Raman amplifier of claim 6 further comprising a second pumping light source that generates a second pumping light, which amplifies the output light from the pumping light source in the first and the second optical fibers.

* * * * *